Sept. 20, 1960 W. E. WALTERS 2,953,383

APPARATUS FOR SELECTIVELY REPRODUCING ANY ONE OR MORE OF MULTIPLE RECORDED PASSAGES ON RECORDING MEDIUM

Original Filed Oct. 18, 1954 6 Sheets-Sheet 1

INVENTOR.
WILBUR E. WALTERS
BY R. W. Hodgson

INVENTOR.
WILBUR E. WALTERS
BY R. W. Hodgson

Sept. 20, 1960 W. E. WALTERS 2,953,383

APPARATUS FOR SELECTIVELY REPRODUCING ANY ONE OR MORE OF MULTIPLE RECORDED PASSAGES ON RECORDING MEDIUM

Original Filed Oct. 18, 1954 6 Sheets-Sheet 3

INVENTOR.
WILBUR E. WALTERS
BY R. W. Hodgson

Sept. 20, 1960 W. E. WALTERS 2,953,383

APPARATUS FOR SELECTIVELY REPRODUCING ANY ONE OR MORE OF MULTIPLE RECORDED PASSAGES ON RECORDING MEDIUM

Original Filed Oct. 18, 1954 6 Sheets-Sheet 4

INVENTOR.
WILBUR E. WALTERS
BY R. W. Hodgson

INVENTOR.
WILBUR E. WALTERS
BY R. W. Hodgson

INVENTOR.
WILBUR E. WALTERS
BY R. W. Hodgson

United States Patent Office 2,953,383
Patented Sept. 20, 1960

2,953,383

APPARATUS FOR SELECTIVELY REPRODUCING ANY ONE OR MORE OF MULTIPLE RECORDED PASSAGES ON RECORDING MEDIUM

Wilbur E. Walters, Yucaipa, Calif., assignor to Joseph J. Muscolino, Sierra Madre, Calif.

Continuation of application Ser. No. 462,734, Oct. 18, 1954. This application Aug. 18, 1958, Ser. No. 756,272

20 Claims. (Cl. 274—15)

This application is a continuation of my copending application Serial No. 462,734, filed October 18, 1954, now abandoned.

Generally speaking, the present invention relates to the sound reproduction art. More particularly, this invention pertains to recorded-passage reproduction apparatus whereby sound reproduction may be selectively initiated at any of a series of predetermined locations on a recording medium and will be automatically terminated after the reproduction of a predetermined portion of said recording medium.

In the art of sound reproduction, there have long existed the problems presented when there is the desirability of selectively initiating sound reproduction of a prerecorded passage on a continuous recording medium and then terminating the reproduction before the physical end of the recording medium. There have been several attempts in the prior art to solve the numerous problems but all of said attempts have failed to accomplish the objectives in one or more major respects. For example, one prior art device permits the indexing of predetermined initiating points in relation to a recording medium but requires operation by a trained expert and is still not adapted for termination of the reproduction at the end of a passage or anywhere else, other than at the end of the entire sequence of passages. Other prior art devices have been able to permit the continuous reproduction of sequentially prerecorded passages on a continuous recording medium in only one order of sequence but neither in selectively variable order nor in non-continuous sequence.

Generally speaking, the present invention includes recorded-passage reproduction apparatus including a pickup head and means for relatively moving, with respect to said pickup head, in reproduction relationship relative thereto, a continuous recording medium bearing a plurality of sequentially prerecorded passages. Also included in the present invention is pickup head positioning means effectively cooperable with respect to the pickup head and the recording medium for positioning said pickup head, with respect to said recording medium, in any of a plurality of different selectable positions for reproducing a selected prerecorded passage. Said pickup head positioning means includes position selector means comprising a control member and a plurality of stop members, said control member being relatively movable with respect to said plurality of stop members, and said stop members being individually and selectively operable with respect to said control member to effectively stop relative movement therebetween in any of a plurality of predetermined positions. Said pickup head positioning means also includes coupling means effectively coupling the movable control member with respect to the pickup head (or recording medium) whereby to effectively position the pickup head, with respect to the recording medium, in a selected position determined by the particular stop member selectively actuated by an operator of the apparatus. Also included is playback control means effectively cooperable with respect to the pickup head and the recording medium for controlling the operative relationship with respect to each other of said pickup head and recording medium in accordance with a predetermined period of time necessary for the reproduction of the prerecorded passages.

From the above general description of the apparatus, it will be obvious to one skilled in the art that the prior art disadvantages are completely or virtually completely overcome in and through the use of my invention.

With the above points in mind, it is an object of this invention to provide a system for the reproduction of any selected one of a plurality of recorded passages sequentially prerecorded on a continuous recording medium.

Another object of the invention is to provide means for positioning a pickup head in reproduction relationship with respect to a continuous recording medium at any selected one of a series of precisely predetermined initiating positions and automatically terminating said reproduction relationship after the expiration of a predetermined period of reproduction.

A further object of this invention is the provision of extremely accurate apparatus for reproducing predetermined passages in accordance with remote, sequential selections.

A still further object of this invention is to provide means for selective reproduction of a plurality of recorded passages, sequentially prerecorded on a continuous recording medium, in continual nonsequential order.

Additional and related objects will be clear to those skilled in the art upon a careful study of this specification, including the following description and drawings, and the appended claims.

In order to aid a more complete understanding of the present invention, reference will be made to the following drawings, in which.

Figure 1:
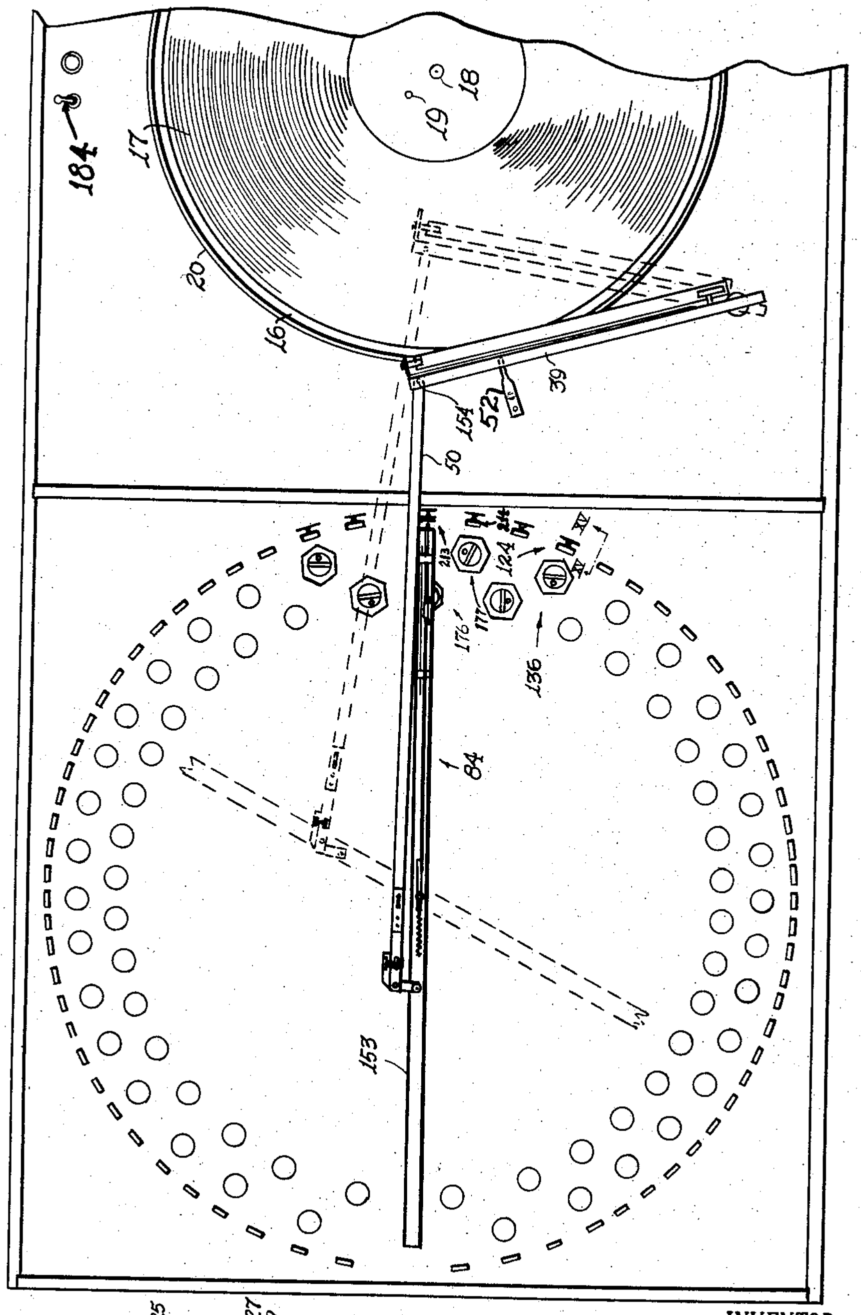
Fig. 1 is a reduced-size plan view of one preferred embodiment of the invention, without the details of construction, showing the relationship of the recorded-passage reproduction apparatus on the right (partly fragmentary) with respect to the pickup head positioning means on the left.

In order to clarify the specific description of the embodiment of the invention illustrated in the drawings, said description will be in sections and subsections, with each section or subsection being labeled with the appropriate heading or subheading.

RECORDED-PASSAGE REPRODUCTION APPARATUS

In general, the invention may include any type of recorded-passage reproduction apparatus including a pickup head and means for relatively moving, with respect to said pickup head, in reproduction relationship relative thereto, a continuous recording medium bearing a plurality of sequentially prerecorded passages. However, in the specific example illustrated, the continuous recording medium comprises a spirally grooved and recorded flat disc, and the recorded-passage reproduction apparatus is of the type customarily employed with such spirally grooved and recorded flat discs.

Figure 4:
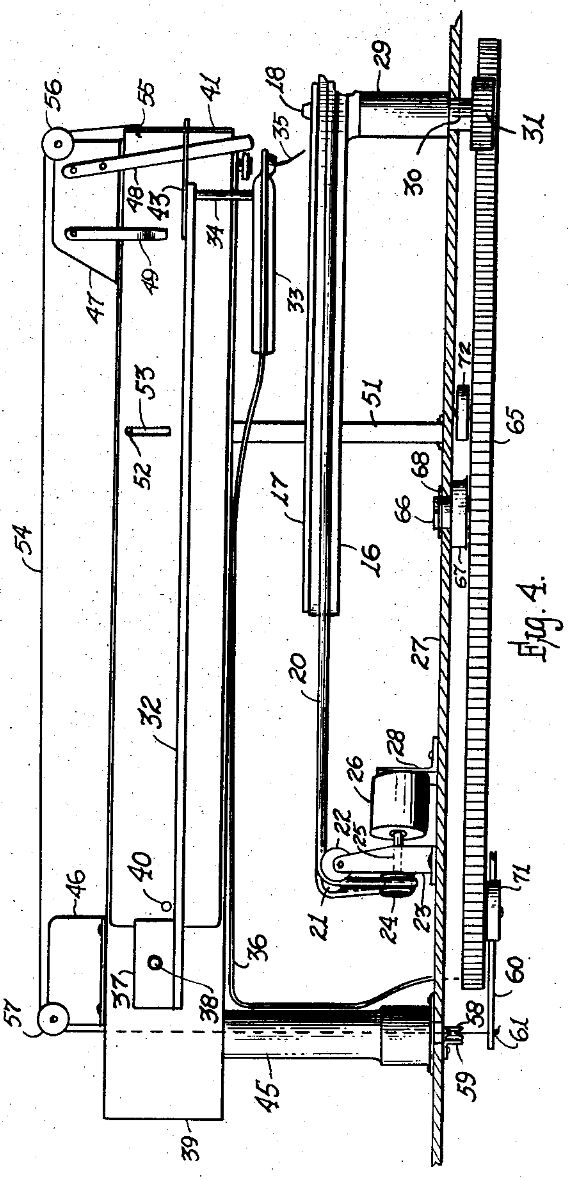
Fig. 4 is an elevational side view of the pickup, tone arm assembly and playback control means, part of which is as seen along the line IV—IV in Fig. 3.
Figure 5:
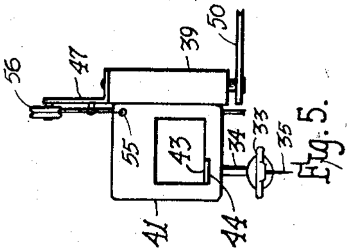
Fig. 5 is an elevational end view of the pickup and tone arm assembly as seen along the line V—V in Fig. 3.

Referring now to the drawings in which identical elements are given the same numerals and particularly to Figs. 1 and 4, there is shown a turntable 16 with a flat disc 17 positioned thereon over a spindle 18 and a locating pin 19, said disc constituting the spirally grooved and recorded continuous recording medium, with the passages recorded from the center portion outwardly toward the periphery. The turntable 16 is driven by an endless frictional belt 20 which almost completely encircles the turntable 16 in a groove (not shown) therein. The endless belt 20 passes over two idling pulleys 21 and 22, which are rotatably mounted on a V-bracket 23, and over a driving pulley 24 which is secured to the central shaft 25 of the turntable motor 26, said motor 26 being mounted to the main apparatus table 27 by a bracket 28 at one end and being supported at the other end by the endless belt 20 around the driving pulley 24. The motor 26 is shown in reduced size for the sake of convenience of illustration, but is relatively larger so as to provide greater downward force against the driving pulley 24 to keep the endless belt 20 taut and supply the necessary driving friction between said driving pulley and belt. The turntable 16 is centrally mounted upon and supported by a bearing shaft 29 in a manner well-known in the art. Centrally located within the bearing shaft 29 is a gear shaft 30 secured to the turntable 16 for rotation therewith and provided with a pinion gear 31 at its lower extremity, the purpose of said gear being made clear hereinbelow under the following subheading.

*Pick-up, tone arm assembly and playback control means*

Figure 6:
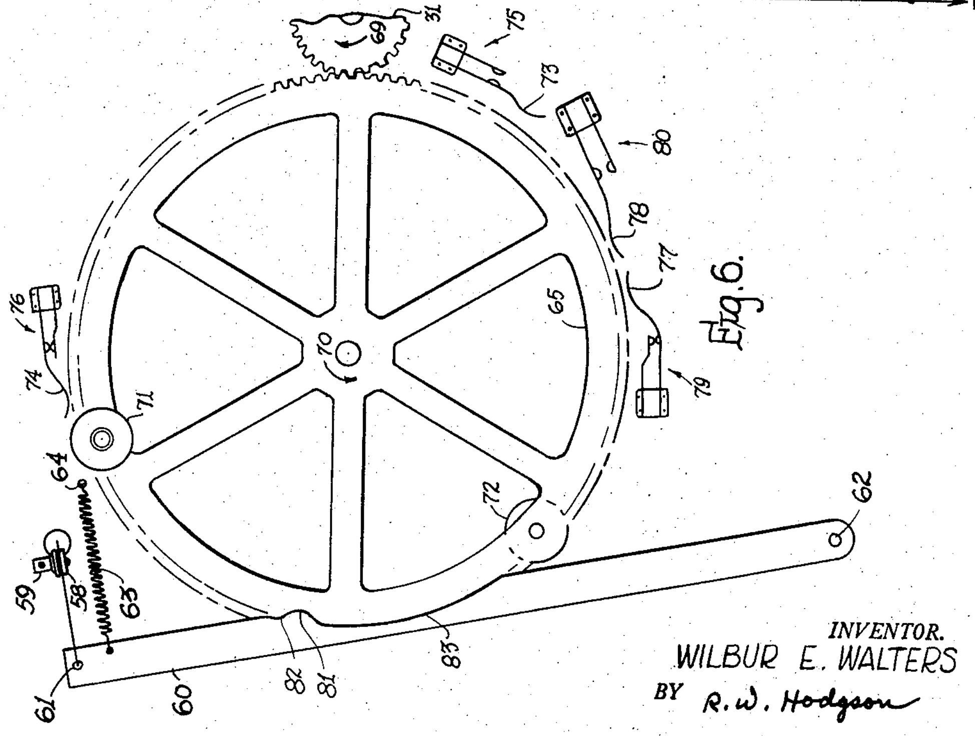
Fig. 6 is a bottom view of the playback control means.

Referring now to Figs. 1 to 6, inclusive, there is seen a tone arm 32 from which is suspended a conventional pickup cartridge or head 33 by means of a rigid pin 34. A stylus or needle 35 is secured to the pickup head 33 and is adapted to engage the grooves in the disc 17. Extending rearwardly from the pickup head 33 is electrical wiring 36 which is connected to an amplifier and thence to a speaker, neither of which is shown, in a manner well-known in the art. The tone arm 32 is provided with a housing 37 which receives a pin 38 in loosely rotatable connection therewith, said pin 38 being secured to the main member 39. The connection between the pin 38 and the housing 37 is such that the tone arm 32 may pivot slightly about the pin 38 in both vertical and horizontal planes. The main member 39 is a rigid piece of metal, which may be preferably aluminum for lightness, strength and rigidity. Rotatably secured to the main member 39 by means of a pivot pin 40 is a tone arm support 41 which is bent at right angles outwardly from said main member and is provided with an opening, indicated generally at 42. The tone arm 32 is provided with a projecting, rectangularly cross-sectioned extension member 43 which extends into and through the hole 42. A notch 44 is located at the bottom of the hole 42 at the position farthest from the main member 39 and is of such dimensions that the extension member 43 may fit precisely therein during the non-playing period and before positioning of the pickup and tone arm assembly, thereby fixing the position of the needle 35 with respect to the main member 39. The main member 39 is rotatably positioned upon a support post 45 which is secured to the main apparatus table 27. Two brackets, 46 and 47, are secured to the upper edge of the main member 39. A finger 48 is fastened to the bracket 47 so as to extend downwardly from said bracket 47 and over the tone arm support 41 in laterally retaining and vertically guiding relationship with respect thereto. A curved spring 49 is also attached to the bracket 47 and also extends over the support 41, in a manner whereby, when the tone arm 32 is lifted by the tone arm support 41 at the end of each playback period, said tone arm will come into contact with the spring 49 and be gently pushed away so as to permit the extension member 43 to fall into the notch 44. Pivotally secured to the main member 39 is a coupling or connecting bar 50 which is cooperably related to the pickup head positioning means, as will be more fully explained later. A vertical bracket 51 is fastened to the main apparatus table 27 and is provided with a horizontally extending finger 52 which is adapted to fit within a slot 53 in both the main member 39 and the tone arm support 41 whereby said members 39 and 41 may rest upon the finger 52 during the rest or non-playback period. A string or cord 54 is tied to the support 41 at the hole 55 and runs over a pulley 56 which is rotatably mounted upon the bracket 47, over a pulley 57 which is rotatably mounted upon the bracket 46, through the support post 45 and the main apparatus table 27, over the pulley 58 which is rotatably mounted by means of the bracket 59 to the main apparatus table 27, and thence to the tone arm lift cam 60 to which the cord 54 is tied at the hole 61. The tone arm lift cam 60 is pivotally mounted to the underside of the main apparatus table 27 by means of a pivot pin 62 at the opposite end from the cord 54 connection thereto. It will be noted that the tone arm lift cam 60 is horizontally displaced from the pulley 58 so that horizontal pivotal movement to the left, as seen in Fig. 6, will cause the cord 54 to pull upwardly on the tone arm support 41, and that horizontal pivotal movement to the right, in said Fig. 6, will cause the support 41 to be permitted to lower. The cam 60 is biased to the right by the coil spring 63 which is secured to the main apparatus table 27 at the hole 64.

As is seen in Figs. 4 and 6, the playback control means includes a timing gear mechanism having a main cam gear 65 which is rotatably secured to the underside of the main apparatus table 27 by a gear shaft 66 with its bearing wheel 67 and washer 68. The previously mentioned pinion gear 31, which rotates in accordance with rotation of the turntable 16, is in constant engagement with the main cam gear 65, whereby said gear 65 will rotate in accordance with the rotation of the turntable 16. The ratio between the gears 65 and 31 may be chosen at any desired ratio depending upon the period of time desired for the playback of the individual passages prerecorded upon the continuous recording medium disc 17. Since the pinion gear 31 rotates at the same speed as the disc 17, the playback time may be chosen by determining the relationship between the sizes of the gears and the speed of revolution of the turntable 17. The directions of rotation of the gears 31 and 65 are indicated by the directional arrows 69 and 70, respectively. Secured to the main cam gear 65 are two wheels 71 and 72 which may be either rotatable or not with respect to the main cam gear 65, but preferably rotatable about their own axes so as to prevent friction against the members they contact, as will hereupon be designated. The wheel 71 comes into sequential displacing contact with the tone arm lift cam 60 and the spring members 73 and 74 of the electrical contactors indicated generally at 75 and 76, respectively. The wheel 72 comes into sequential displacing contact with the spring members 77 and 78 of the electrical contactors indicated generally 79 and 80, respectively. The location of all of said containers 75, 76, 79 and 80 is critical in this particular arrangement because of the necessity of precise sequential or simultaneous actuation of the contactors, as will be explained later in connection with the operation of the over-all apparatus. It will be noted that the tone arm lift cam 60 is provided with a contoured lateral surface having an initial hump 81 preceded by a slight concavity 82 and followed by a smooth continuous concavity 83 having the same radius of curvature as that of the circle defined by the outermost portion of the wheel 71 as the gear 65 is rotated. In operation, the wheel 71 will come into forceful contact with the hump 81 at the same time as the wheel 72 is in forceful contact with the spring member 77 of the contactor 79, so that the contactor 79 will be open as the tone arm lift cam 60 is suddenly moved forcefully to the left, which movement will cause the tone arm support 41 to be raised. The wheel 72 will thereupon move into contact with the spring member 78 of the contactor 80, closing said contactor 80 as the wheel 71 proceeds along the concavity 83. After leaving the concavity 83, the wheel 71 will proceed to close and open consecutively the contactors 75 and 76, respectively. The purposes of the electrical contactors will be fully described in connection with the electrical circuitry hereinafter.

Returning to Figs. 2 to 6 inclusive, the cooperable relationship of the pickup and tone arm assembly and playback control means is hereinafter described. During the resting or non-playing period, the main member 39 and tone arm support 41 are resting upon the finger 52 and the tone arm extension 43 is lodged securely in the notch 44. When it is desired to play a particular passage on the recording medium, the pickup and tone arm assembly is positioned by means of the connecting bar 50 in a manner which will be explained later. The turntable motor 26 begins rotation of the turntable 16, which causes rotation of the main cam gear 65. The cam wheel 71 is positioned against the concavity 83 so that the needle 35 is positioned directly above the beginning point of the particular passage desired on the recording medium. As the cam wheel 71 leaves the concavity 83, the tone arm lift cam 60 is permitted to pivot about its pivot point 62 to the right as seen in Fig. 6, thereby permitting the string 54 to lower the tone arm support 41 so that the needle 35 will come into contact with the appropriate groove on the disc 17, and the tone arm 32 will then be free floating. At the termination of the playback period of said passage, the cam wheel 71 will strike the hump 81 on the tone arm lift cam 60 and cause the tone arm support 41 to be quickly raised. The slight depression or concavity 82 does not decrease the sharpness of said raising, but adds to the smoothness of the operation. Since the main member 39 has been rigidly positioned throughout the playback period by the connecting bar 50, and the tone arm 32 has been free floating, the tone arm extension 43 will now be positioned towards the far side of the hole 42 in the tone arm support 41. As the tone arm support 41 is raised, it will contact and lift the tone arm extension 43, thereby lifting the needle 35 from the disc 17. The side of the tone arm 32 will gently strike the spring member 49 which will laterally force the tone arm extension 43 into the notch 44. As the cam wheel 71 progresses along the concavity 83, the connecting bar 50 will either be positioning the entire assembly in a new position preparatory to playing another passage, or else will be returning the entire assembly to its resting position upon the finger 52, in which latter case the turntable motor 26 will stop.

*Pick-up head positioning means*

Generally speaking, the pickup head positioning means effectively cooperates with respect to the pickup head (and, in certain cases, with respect to the recording medium) for relatively positioning said pickup head with respect to said recording medium in any of a plurality of different selectable positions for reproducing a selected prerecorded passage. Said pickup head positioning means includes a position selector means and coupling means effectively coupling the position selector means with respect to the pickup head (or recording medium) whereby to effectively position the pickup head with respect to the recording medium in a selected position. Said position selector means is more specifically set forth under the following subheading.

*Position selector means*

The position selector means includes a control member and a plurality of stop members, said control member being relatively movable with respect to said plurality of stop members, and said top members being individually and selectively actuatable with respect to said control member to effectively stop relative movement therebetween in any of a plurality of predetermined positions.

Figures 7, 8, 9, 10:
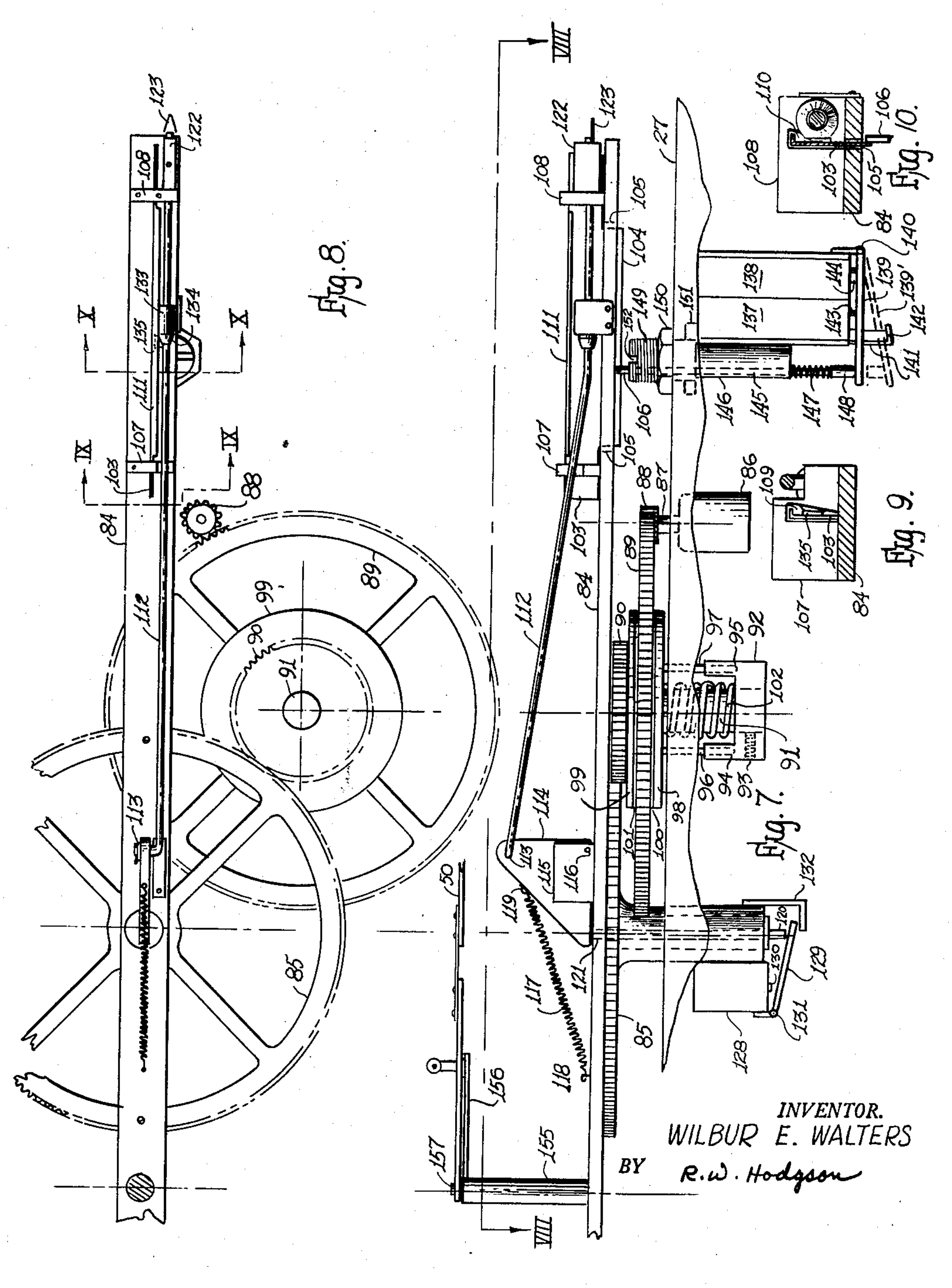
Fig. 7 is an elevational side view of the position selector apparatus with a fragment of the coupling means.
Fig. 8 is a plan view of the position selector apparatus as seen along the line VIII—VIII in Fig. 7.
Fig. 9 is a cross sectional elevational view of a portion of the position selector apparatus taken along the line IX—IX of Fig. 8.
Fig. 10 is a cross sectional elevational view, similar in aspect of Fig. 9, taken along the line X—X of Fig. 8.

As seen in Figs. 1, 7 and 8, the control member includes a longitudinal arm 84 which is positioned over and parallel to the main apparatus table 27 so as to permit rotatable sweeping over said table by said arm 84. The arm 84 is secured to a drive gear 85 which is rotatably mounted to the main apparatus table 27 in a manner well-known in the art. The gear 85 and the subsequently described gears are not shown in Fig. 1 for the sake of clarity of description and convenience. A selector motor 86 is in cooperably driving relationship with respect to the drive gear 85 by means of a gear train and friction gear. The selector motor's shaft 87 is provided with a pinion gear 88 at the end thereof, said gear 88 being in engagement with the friction gear 89. Said friction gear 89 is in cooperable engagement with the coupling gear 90 which is in lateral engagement with the drive gear 85. The cooperable engagement between the friction gear 89 and the coupling gear 90 is provided as follows: rigidly fastened in central relationship with respect to the gear 90 is a shaft 91; a collar 92 is secured to the shaft 91 by means of a set screw 93; the collar 92 has holes 94 and 95 drilled into it in which the pins 96 and 97, respectively, may freely move; said pins 96 and 97 are secured to the clutch ring 98; another clutch ring 99 is secured to the gear 90; between the clutch rings 98 and 99, respectively, and the friction gear 89 are graphite-coated plates of paper 100 and 101, respectively; a compressed coil spring 102 is positioned around the shaft 91 and seated against the collar 92 and the clutch ring 98. The shaft 91 is centrally located through all of the above-described members below the gear 90, in closely fitted but non-engaged relationship with respect to said members. The force exerted by the compressed spring 102 against the clutch ring 98 causes frictional engagement of the friction gear 89 with respect to the coupling gear 90. The amount of frictional force can be adjusted by vertical positioning of the collar 92 with respect to the shaft 91, with the selected position being maintained by the set screw 93. As will be explained more fully later, the friction gear arrangement permits the maintenance of the control member against the individual stop members during the recorded passage reproduction periods without placing undue strain upon the selector motor 86 or any of the mechanical connections.

As seen in Figs. 7 through 10, the control member's longitudinal arm 84 is provided with a stop blade 103 which has a lower projection 104 loosely inserted through a longitudinal slot 105 in the arm 84 so as to extend downwardly a distance sufficient to assure lateral contact with the stop pins of the stop members, of which one stop pin is indicated at 106 in its operative position with respect to the stop blade's projection 104.

Figure 15:
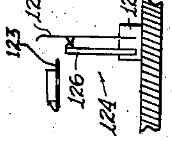
Fig. 15 is a side elevational view of a release contact device taken along the line XV—XV of Fig. 1.

Brackets 107 and 108 are secured to the longitudinal arm 84 and provided with slots 109 and 110, respectively, through which the wings of the stop blade 103 project loosely, whereby said stop blade may have a hinge-like action that will be explained hereafter. The lip 111 on the stop blade 103 provides longitudinal rigidity of said blade. A kicker rod 112 is pivotally secured at 113 to a rotatable member 114 which is secured to the bracket 115 by the pivot pin 116, said bracket 115 being attached to the longitudinal arm 84. A coil spring 117 is attached at one end 118 to the arm 84 and at the other end 119 to the rotatable member 114 and is in constant tension so as to bias said member 114 into contact with the longitudinal arm 84 directly above the kicker relay pin 120, whereby forceful vertical movement of said pin 120 through the vertical hole 121 will cause rotation of the member 114 about its pivot pin 116. The other end of the kicker rod 112 passes through a guiding bracket 122 and is provided at its extremity with a kicker tip 123, preferably composed of an insulating material. As seen in Fig. 15, the kicker tip 123 is effectively adapted to open the normally closed release contactor, indicated generally at 124, by forcing the spring contact 125 to the right, thereby separating said contact from its counterpart, contact 126. Said contacts 125 and 126 have their ends set rigidly in the support 127, which is secured to the main apparatus table 27. The opening of the release contactor 124 will occur when the kicker rod 112 is forced to the right by upward movement of the kicker relay pin 120. Said movement of said pin 120 is caused by actuation of the kicker relay 128, which magnetically causes drawing up of the bar 129 against the relay's contact button 130. Said bar 129 is hinged at 131. A support arm 132 prevents the arm 129 from falling too far away from the relay 128 when said relay is de-energized.

Returning to the kicker rod 112, it can be seen that a collar 133 is secured to said rod and is provided with a circumferentially bevelled end 134, which is adapted to abut against a shoe 135, which is provided with a correspondingly bevelled concavity. The shoe 135 is secured to the stop blade 103. Except during the short period of time in which the kicker rod 112 has been forced to the right, the collar's end 134 is wedged against the shoe 135 so as to maintain the stop blade 103 in a rigid vertical position whereby the stop blade's lower projection 104 may come into positive contact with the stop pin 106 (or any other of the stop pins which may have been actuated) and will maintain that position during the playback period. Immediately upon termination of the particular selected passage, the kicker relay 128 will be energized, causing the kicker rod 112 to be forced to the right, thereby releasing the rigid positioning of the stop blade 103 so that it will become loose in the slots 109 and 110 and swing in a hinge-like manner, thereby releasing most of the friction between the projection 104 and the stop pin 106 which might prevent said stop pin from dropping when the recorded passage terminates.

Referring to Fig. 1, it can be seen that a plurality of stop members, one of which is indicated generally at 136, are positioned in concentric circles, and are circumferentially spaced in a geometric pattern which corresponds to the circular nature of the recording medium 17 and the lever arm mechanics of the particular embodiment illustrated. Each stop member has its corresponding electrical release contactor in radial alignment therewith, as contactor 124 is in alignment with stop member 136.

Returning to Fig. 7, a somewhat detailed view of a stop member may be seen, associated with the stop pin 106. The physically parallel coils, indicated generally at 137 and 138, are in series electrically and will, when energized, cause upward movement of the bar 139 by magnetic attraction, which bar is shown in the non-energized position at 139'. Said bar is pivoted at 140. A retainer 141 has a foot 142 which is located below the bar 139' in support thereof, when the coils 137 and 138 are not energized. Insulating buttons 143 and 144 are positioned at the ends of the coils 137 and 138, respectively, to prevent magnetic sticking of the bar 139 after said coils are de-energized. The stop pin 106 is located in an eccentric hole 145 in a cylindrical vertical member 146, and is provided with a compressed spring 147 which abuts against the stop pin's lower tip 148 and said cylindrical member 146 in downwardly biasing action with respect to the pin 106. The upper portion of the cylindrical member 146 is provided with external threads 149 so that said member 146 may be secured to the main apparatus table 27 by two lock nuts 150 and 151 positioned on opposite surfaces of the table 27. The upper portion of the cylindrical member 146 is provided with a slot 152 adapted to receive a screwdriver tip. Speaking generally, the geometric positioning of the stop members as seen in Fig. 1 provides only a rough adjustment for controlling the stopping of the control member at specific points in accordance with the desired positioning of the tone arm assembly and pickup head through the coupling means. Extremely fine adjustment is obtained by rotation of the cylindrical member 146 about its own vertical axis, thereby causing rotation of the stop pin 106 about said axis, which causes variation in both the circumferential and radial positioning of the stop pin with respect to the concentric circles shown in Fig. 1. Said rotation of the cylindrical member 146 is obtained by loosening the upper lock nut 150, turning said member 146 with a screwdriver inserted into the slot 152, and then tightening the lock nut 150 again.

As the longitudinal arm 84 sweeps over the stop pins, the stop blade will come into contact with whichever stop pin is lifted by actuation of its corresponding stop member. It can thus be seen that the position of the arm 84 is determined by the particular stop pin that has been lifted. The back end portion 153 of the longitudinal arm 84 is provided with the coupling means which will be described more fully hereinafter under the following subheading.

*Coupling means*

The coupling means effectively couples the movable control member with respect to the pickup head (or, in certain cases, the recording medium) whereby to effectively position the pickup head with respect to the recording medium in a selected position determined by the particular stop member selectively actuated by an operator of the apparatus. In the specific form illustrated, the coupling means mechanically connects the movable control member with respect to the pickup head, and, furthermore, this effective connection actually takes place through and by means of the tone arm assembly only during those periods when the tone arm assembly and the pickup head are effectively joined together by the playback control means previously described.

Figures 2, 11, 14:
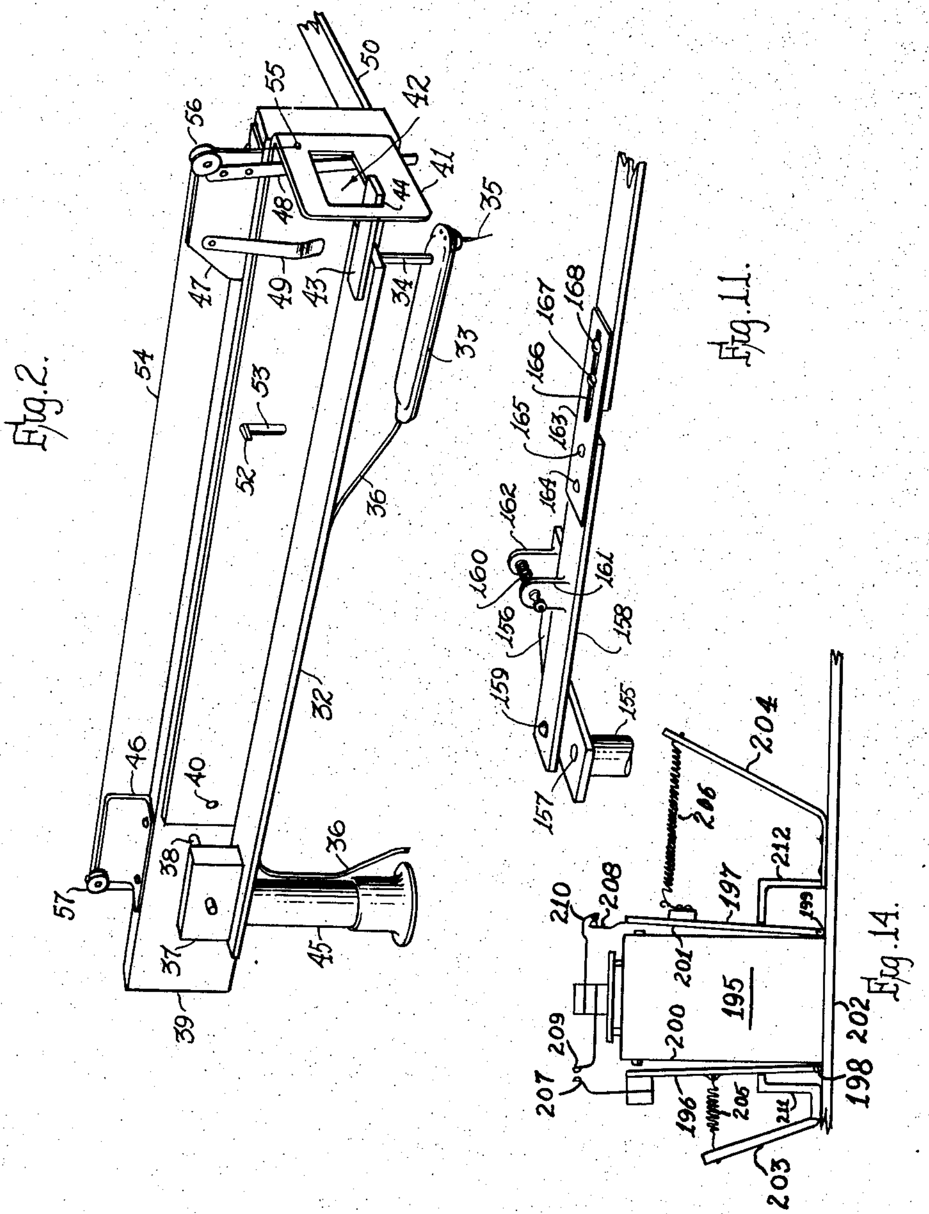
Fig. 2 is a perspective view of the pickup and tone arm assembly.
Fig. 11 is a fragmentary perspective view of the coupling means, showing the adjustable features thereof.
Fig. 14 is a side elevational view of the master current and limiting relay.
Figure 3:
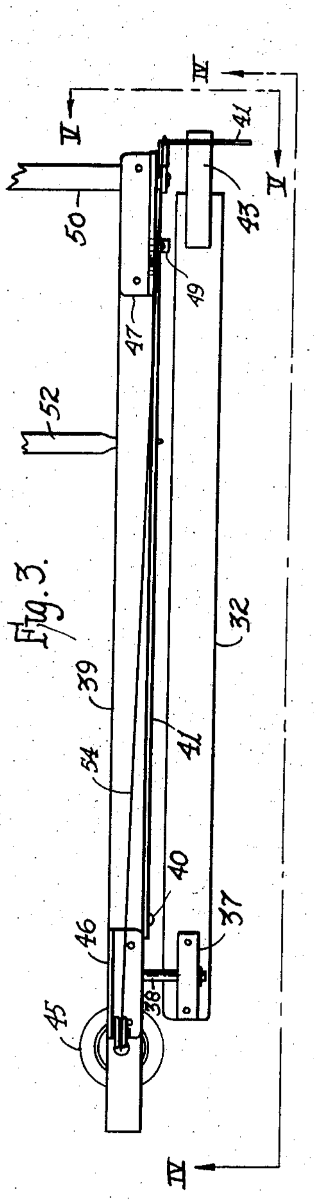
Fig. 3 is a plan view of the pickup and tone arm assembly.

As seen in Fig. 1, the connecting bar 50 is attached to the pickup assembly's main member 39 by pivot pin 154 so that movement of the connecting bar 50 will cause corresponding positioning movement of said main member 39. In Figs. 7 and 11, it can be more clearly seen that the other end of the connecting bar 50 is cooperably related to the rear portion of the longitudinal arm 84. A post 155 is secured to the longitudinal arm and is provided with an angle member 156 in pivotal relationship with respect thereto by means of a pivot pin 157. A plate 158 is attached to the angle member 156 at 159 and it is also adjustably connected to said member 156 by means of a screw 160 threadably engaging the two projections 161 and 162 on the plate 158 and angle member 156, respectively. The plate 158 is in linear alignment with and connected to the connecting bar 50 by means of an adjustable connector 163, which is secured to the plate 158 by rivets 164 and 165 and provided with a longitudinal slot 166, in which slot screws 167 and 168 can be relatively moved with respect to said slot for effective lengthening or shortening of the connecting bar 50. By means of the connector 163, an adjustment can be made for the length of the connecting bar 50 in accordance with the radial length of the grooved portion of the record disc 17. The adjustable screw 160 permits a rough adjustment of the positioning of the pickup and tone-arm assembly with respect to the initial positions for the recorded passages. As previously explained, each of the individual magnetic stop members can be adjusted for the individual initial positions by rotation about their axes, giving the finer adjustment.

The solid-line apparatus illustrated in Fig. 1 shows the resting position of the device. The dash-line apparatus illustrates one operative position. As can be seen from these two positions, as the longitudinal arm 84 rotates above the stop pins, the pickup and tone-arm assembly is variously positioned over the disc 17. If a stop pin, such as 106, is in a lifted position due to selective actuation by the operator of the apparatus, the pickup and tone-arm assembly will be positively positioned in the starting position above the disc 17 corresponding to the passage selected by the operator. The operation of the entire apparatus will be described in detail later.

ELECTRIC CIRCUITRY

Figure 13:
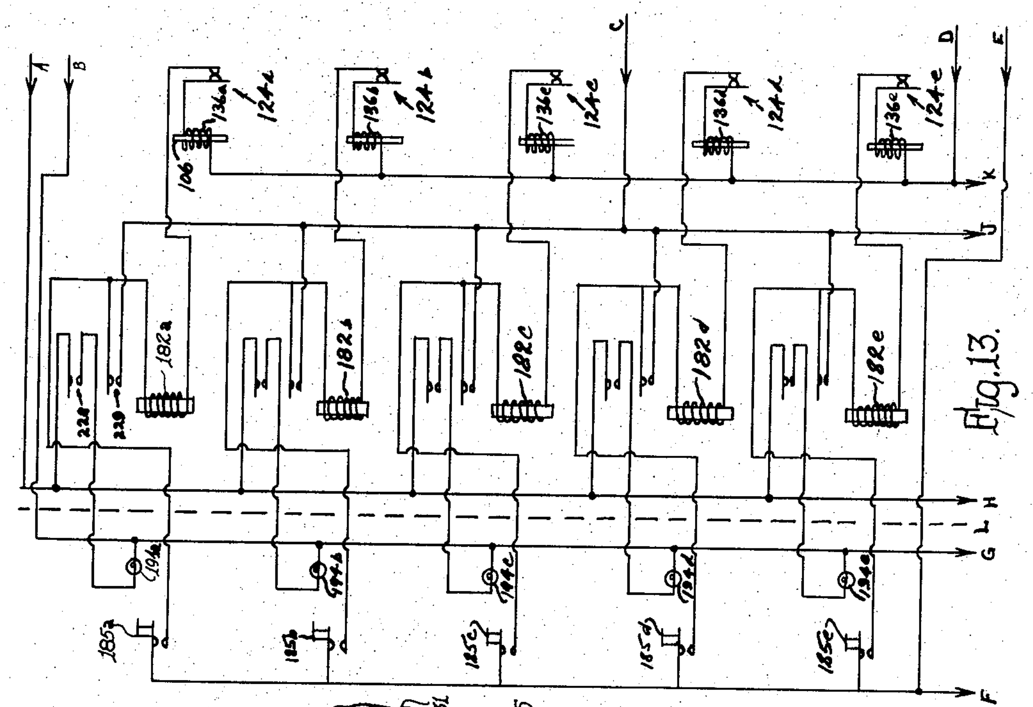
Fig. 13 is a continuation of the schematic of Fig. 12.
Figure 12:
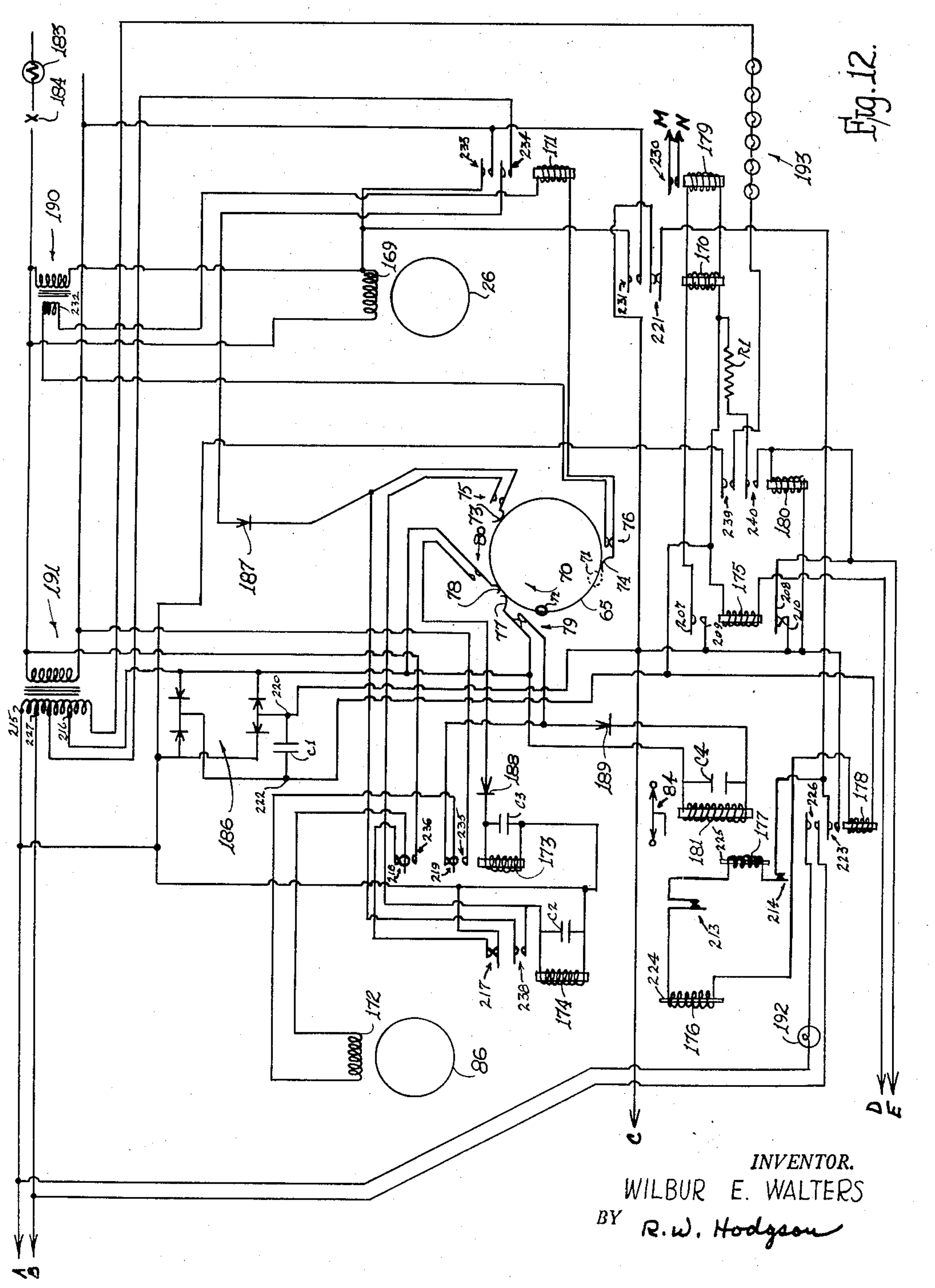
Fig. 12 is a schematic of an electrical circuit for control of the various mechanical elements.

Figures 12 and 13 schematically illustrate the electrical control circuits and some of the mechanical parts. Where an electrical symbol is used for a previously described mechanical part, it is designated by the same numeral whenever possible to do so. Various electrical circuits and components have not been illustrated in detail because they are well-known in the art and would merely detract from an understanding of this invention as embodied in this specific application.

Certain major components will be designated first in order to preface and aid the description to follow thereafter. Many of the components of the specific embodiment illustrated are not essential to the operation of the apparatus, but have been included simply because a prototype suitable for use in a large retail food market has been made, embodying these components, and they help to illustrate the adaptability and at least one use of this invention.

The turntable motor 26 is associated with its primary winding 169, the turntable motor-starting relay 170 and the turntable motor-stopping relay 171. The selector motor 86 is associated with its primary winding 172, the selector motor booster relay 173 and the selector motor stop relay 174. Various other relays are designated as follows: The master current and limiting relay 175; the idler stop lift magnet 176; the idler safety stop lift magnet 177; the idler stop holding relay 178; the amplifier-current release relay 179; the "wait" signal relay 180; the kicker relay 181; the stop lift magnets, one of which is designated as 136*a* and others of which are located in a line directly therebelow as 136*b*, 136*c* and so forth; and the stop lift control relays, one of which is designated as 182*a* and others of which are located in a line directly therebelow as 182*b*, 182*c* and so forth. The following are additional components: The alternating current line fuse 183; the main power switch 184; manually operated push buttons, of which one is designated as 185*a* and others are located in a line directly therebelow as 185*b*, 185*c* and so forth; release contactors, of which one is designated generally as 124*a* and others of which are located directly therebelow as 124*b*, 124*c* and so forth; a 4-way rectifier indicated generally at 186, capable of delivering at least one ampere of rectified current; additional rectifiers indicated at 187, 188 and 189; a transformer indicated generally at 190 which energizes the turntable motor-stopping relay 171; the main power transformer indicated generally at 191, which transformer reduces the current for the rectifiers so as to maintain approximately 35 volts of direct current, operates the main portions of the entire mechanism, and supplies approximately 55 volts alternating current in the selector motor 86; the idler light 192; a series of "wait" signal lights indicated generally at 193 and adapted to illuminate "wait" message panels; and push button indicating lights, of which one is designated 194*a* and others are located in a line directly therebelow as 194*b*, 194*c* and so forth.

Several capacitors and a resistor are located throughout the device, for purposes well-known in the art, and are designated at C1, C2, C3, C4 and R1, the last having about 100 ohms resistance. The leads A, B, C, D, and E in Figs. 12 and 13 are connected to their respective continuations. The leads F, G, H, J and K in Fig. 13 have been terminated for the sake of clarity and simplification of illustration, but are actually connected to a series of identical components which are connected and arranged as illustrated for the five push buttons and corresponding components shown. In the prototype I have made and operated, there are ninety-six push buttons with their corresponding components. The leads M and N are connected to the high voltage transformer of the power supply of the audio amplifier, none of which is shown because it is so well-known in the art.

The dash-line indicated at L represents the convenient mechanical separation between the main body of the mechanism and the panel control board components. I have operated numerous panel control boards simultaneously, each of the push buttons and components being in parallel electrically with its corresponding parts on the other boards. The "wait" signal lights 193 are located individually in each panel control board.

The main cam gear 65 and its associated contacts are seen as though from the "top," as opposed to the mechanical "bottom" view in Fig. 6. All of the contacts are illustrated in their normal open or closed position when the entire device is in a quiescent state.

The master current and limiting relay 175 is shown in some mechanical detail in Fig. 14 and constitutes an electromagnet which is operative on both ends. This relay initiates the operations of the principal portions of the entire device and, at the same time, serves to limit the number of push buttons that can be operated simultaneously with any actuation effect. The iron cylinder, indicated generally at 195, has a horizontal axis and contains a coil of heavy wire (not shown). Two iron armatures 196 and 197 are located at opposite ends and are hinged at 198 and 199, respectively, so as to be able to pivot towards and away from the cylinder 195. On the inner surface of each of the armatures 196 and 197 is a thin bronze sheet or strip 200 and 201, respectively. A bracket 202, to which the cylinder 195 and the hinges 198 and 199 are secured, is provided with mounting posts 203 and 204 to which are attached tension biasing springs 205 and 206, respectively, which are in turn attached to the armatures 196 and 197, respectively, so as to tend to maintain them in an outward position with respect to the coil, as illustrated. The contacts 207 and 208, which are attached to but insulated from the armatures 196 and 197, respectively, are thus in normally open and closed, respectively, relationship with respect to their counterparts, contacts 209 and 210, respectively. Posts 211 and 212 serve to limit the outward movement of the armatures 196 and 197, respectively. The mounting posts 203 and 204 may be manually bent inwardly or outwardly, as may be desired, to adjust the tension of the springs 205 and 206, respectively, for desired performance. Contacts 207 and 209 close at the pressing of any one push button and remain closed as long as any push button has been actuated. Contacts 208 and 210 remain normally closed and open only when too much current passes through the coil, as when, for example, five push buttons have been actuated during the same period and are "waiting" for the playing of their corresponding passages. Thus, the adjustment of the mounting post 204 determines the number of buttons which may be actuated at the same time before the "wait" signal lights 193 will be energized.

Viewing Figs. 1 and 12, the idler stop member, indicated generally at 176 in Fig. 1, is located so that its stop pin (not seen) will positively position the control member in its resting position, with the pickup and tone-arm assembly resting on its support 52, when no push buttons have been actuated. The idler safety stop member, indicated generally at 177 in Fig. 1, is a duplicate of the idler stop member 176 and is designed to operate simultaneously with said member 176 as a safety factor under the following conditions: when the power to the device has been turned off, the stop lift magnets, including those of the idler and idler safety stop members, will be de-energized; the control member will remain at its resting position because of the absence of any force tending to move it, and the idler stop pin will tend to remain up and in contact with the stop blade because of friction; however, the idler stop pin may drop after a while, leaving the control member free to move, which it may do by a slight amount so as to be a fraction of an inch clockwise of the idler stop pin; in this event, when the power to the device is turned back on and the idler stop pin is automatically raised, the control member would be able to make a complete rotation before stopping against the idler stop pin, all without being synchronized with the playback control mechanism, with the possible result of scratching the stylus across the record as the pickup and tone arm assembly would not be lifted by the playback control mechanism. Thus, the idler safety stop member serves the function of raising an idler stop pin in front of the control member when the main power to the device is turned on. The idler release contactors 213 and the idler safety release contactors 214 operate the same way as the release contactors of the other stop members. Those components, principally various contacts, the function of which have not previously been explained, will be more clearly described under the following heading.

MODE OF OPERATION

The operation of the apparatus shall be described through a complete cycle.

When the main power switch 184 is turned on, current flows into the transformer 191. The rectifier 186, being directly across the secondary winding of the transformer 191 at taps 215 and 216, obtains power immediately and places a positive and negative potential on leads D and E, respectively, the contacts 208 and 210 being closed. At the same time, transformer 191 supplies a low voltage of approximately 55 volts to the primary winding 172 of the selector motor 86, the circuit being from the tap 215, through the closed contact 217 and 218 of the selector motor's stop relay 174 and booster relay 173, respectively, to the primary winding 172, through the closed contacts 219 and 79, to the tap 216 on the transformer 191 again. The selector motor 86, being energized with this low voltage, holds a tension on the control member's stop blade 103 against the stop pin that has been raised. At the same time, the idler stop lift holding relay 178 is energized, the circuit being from the negative potential point 220 of the rectifier 186, through the closed contacts 221, through the idler stop components 214, 177, 213 and 176 to the relay 178 and then to the positive potential point 222, the direct current potential between points 220 and 222 being approximately 35 volts. Idler stop lift holding relay 178 closes contacts 223, placing the idler stop components directly across the 35 volt potential so that the idler stop pins 224 and 225 will remain up until a button is pushed for selection of a recorded passage. Relay 178 also closes contacts 226, thereby lighting the idler light 192 by placing it across taps 215 and 227 on the transformer 191. Nothing else changes: everything remains waiting for the selective actuation of a push button.

Assuming that the push button **185*a*, for example, is selected and pressed, the stop lift control relay 182*a*, the stop lift magnet 136*a*, and the master current relay 175 will be energized by being placed in series across the 35 volt potential of points 220 and 222. Said magnet 136*a* will cause its stop pin 106 to be raised. Said relay 182*a* will close contacts 228 and 229, contacts 228 causing the push button indicating light 194*a* to be placed across taps 215 and 227 and therefore lighted. The master current relay 175 closes its contacts 207 and 209, causing the turntable motor starting relay 170 and the amplifier-current release relay 179 to be energized by being placed across the potential points 220 and 222**.

Said relay 179 closes contacts 230, which release the B+ voltage to the audio amplifier that plays the recorded passages. Said relay 170 closes contacts 231, which places the primary winding of the transformer 190 and the turntable motor's primary 169 directly across the 110 volt alternating current supply, thus starting the turntable motor 26 and energizing the secondary winding 232 of the transformer 190. Turntable motor stopping relay 171 is directly across the secondary winding 232 through the closed contacts 76, thus closing contacts 233 and 234.

The turntable motor 26 starts turning the turntable 16 which, through the pinion gear 31, turns the main cam gear 65, as explained previously in relation to Fig. 4. The main cam gear 65 turns in the direction 70, shown in Figs. 6 and 12. As said gear 65 begins to turn, cam wheel 71 lifts the tone-arm assembly from its resting position and cam wheel 72 opens contacts 79, the latter action having the effect of permitting the alternating current that is flowing through the selector motor's winding 172 to pass through the rectifier 189 and energize the kicker relay 181, whereby the kicker rod tip 123 will abruptly open the idler release contactors 213 or 214 (whichever happens to be in line), de-energizing the idler stop lift magnets 176 and 177 and the idler stop holding relay 178. Thus, the idler stops pin 224, and 225 will drop and the longitudinal arm 84 will begin to rotate. Note particularly that cam wheel 72 keeps the contactor 79 open for only a short period of time, that time being sufficient for the release contacts 213 and 214 to open and immediately close. When the idler stops drop, the cam wheel 72 immediately closes the contacts 80, causing actuation of the selector motor booster relay 173 which closes contacts 235 and 236 so as to permit the full 110 volts of alternating current to be impressed across the selector motor's winding 172. This large current lasts for only a very short period of time, as the cam wheel 72 releases the contacts 80 as it moves on, but this period is sufficient for the selector motor 86 to be given a boosted start to find the stop pin that has been lifted by the pressing of the corresponding push button. Said booster current makes it possible for the selector control member to find the stop member during the interval of time it takes the turntable to make one revolution.

As soon as the control member has contacted the stop member that is in its order of rotation, the control member stops abruptly and positively in the selected position and is held there by the selector motor which continues to tend to rotate the control member through the friction clutch that is in the gear train.

During all of this time, cam wheel 71 has been holding the pickup and tone-arm assembly above the recording medium as said assembly has been positioned by the coupling means. Now, cam wheel 71 moves far enough to let said assembly descend for contact with the recording medium.

Cam 71 then closes contacts 75, which energizes the selector motor stop relay 174, thereby opening contacts 217 and closing contacts 238. By opening contacts 217, all current to the selector motor's winding 172 is cut off, causing said motor to stop momentarily. The stylus is on the record during approximately five-sixths of the time it takes main cam gear 65 to revolve one time, under the arrangement illustrated here.

It should be noted here that cam wheel 71 actuates the tone-arm lifting mechanism, the closing of contacts 75 and the opening of contacts 76, while cam wheel 72 only actuates the opening of contacts 79 and the closing of contacts 80. Cam wheel 71 is set in relation to cam wheel 72 so that at the instant cam 71 lifts the tone-arm assembly from the recording medium, cam 72 opens contacts 79 which drops the stop pins.

Near the end of the playing period of the passage, cam wheel 71 opens contacts 76, which de-energizes the relay 171 momentarily, thereby opening contacts 234. Since contacts 234 are in series with the holding contacts 238 of selector motor stop relay 174, said relay 174 will be de-energized and contacts 217 will close, sending current back into the selector motor again and thereby holding the pressure against the lifted stop pin 106. Thus, the low voltage is on the selector motor during the passing of cam 71 from contacts 76 to contacts 75 except for the momentary cutoff of almost all of the current when cam 72 opens contacts 79 and the momentary boost of the current when cam 72 closes contacts 80.

After the playing of the selected passage, cam 71 lifts the tone arm assembly, cam 72 opens the contacts 79 and the release contacts 124 for the lifted stop pin 106 are suddenly opened and closed by the action of the kicker relay 181 transmitted to the kicker tip 123. At that time, the stop pin 106 drops and the selector motor 86 is given a boost by the action of cam 72 closing contacts 80, causing the control member to either find another stop member that may have been actuated or go to the idler stop member 176 which would be actuated in the absence of any actuated push buttons. In the event that no other push buttons have instituted another cycle, the current through the master current relay 175 would be stopped, de-energizing motor starting relay 170 and amplifier-current release relay 179, and actuating idler stop holding relay 178 and idler stop lift magnets 176 and 177.

When the control member comes to rest at the idler stop member, the cycle continues the same as for a reproduction cycle except that the pickup and tone-arm assembly has been brought to rest on the support 52, where it stays during this stopping cycle. When the stopping cycle is completed, the cam wheel 71 opens contacts 76; due to the fact that there is no current in turntable motor starting relay 170, the turntable motor 26 comes to a stop. The device now stands idle until another push button is pressed.

Relay 175 serves the additional purpose of being a limiting relay. Since the current through relay 175 is directly proportional to the number of push buttons that have been actuated, the contacts 208—210 will open when the tension of the spring 206 is overcome by electromagnetic attraction. Then, if another button is pressed, the current that has been going through the normally closed contacts 208—210 will pass through the "wait" signal relay 180 which is in parallel with said contacts. Said relay 180 will be energized as long as the contacts 208—210 remain open. Relay 180 closes contacts 239 and 240, causing the "wait" signal lights 193 to be actuated, thereby giving notice that all other buttons are inactive until several passages have been played.

CONCLUSION

A considerable range of modifications of the overall apparatus and/or various components thereof is contemplated within the scope of the invention. For example, the pickup head and recording medium need be only relatively movable with respect to each other, so that the recording medium may be adapted to be stationary during the playback period while the pickup head traversed the prerecorded passage portion of said recording medium.

For another example, the plurality of stop members of the pickup head positioning means may be effectively adapted to be selectively rotated while the control member of said pickup head positioning means remains stationary, accompanied by an effective adaptation of the coupling means for relative positioning of the pickup head with respect to the recording medium. Another modification contemplates pickup head positioning means having rectilinearly movable control member means effectively indexed by selectively actuatable stop members.

While the invention has been specifically described in a form embodying recorded-passage reproduction apparatus of the type adapted to play back a recording of the spirally grooved and recorded flat disc type, the invention is not limited to this arrangement, but also encompasses arrangements embodying other types of reproduction apparatus adapted to play back other types of recordings. For example, magnetic type, sound reproduction apparatus of the drum, tape or wire types (or other types) may be employed within the basic spirit and scope of the present invention. One such magnetic type, sound reproduction apparatus of the drum type recording medium (or transport therefor) variety is more specifically described, illustrated and claimed in copending patent application, Serial No. 575,384, filed April 2, 1956.

Other modifications, within the spirit and scope of this invention, will be obvious to those skilled in the art upon careful examination of this specification.

The word "sequentially" used in the expression "sequentially prerecorded passages," and similar expressions herein, is merely intended to mean that different ones of the prerecorded passages are related with respect to each other and the recording medium in a manner such that, if the recording medium is continuously operated with respect to the pickup head, said recorded passages will be reproduced sequentially.

I do not intend to limit the invention (and/or patent application) to the specific version described and illustrated, but limit it only in the light of the prior art and the appended claims, with due consideration for the doctrine of equivalents.

I claim:

1. Apparatus for reproducing any selected one of a plurality of recorded passages sequentially prerecorded on a continuous recording medium, comprising: a pickup head; motor means cooperable to relatively move in a reproducing direction, with respect to said pickup head and in reproduction relationship relative thereto, a continuous recording medium bearing a plurality of sequentially prerecorded passages; pickup head positioning means effectively cooperable with respect to the pickup head and the recording medium for positioning said pickup head, with respect to said recording medium, in any of a plurality of different selectable positions for reproducing a selected prerecorded passage; said pickup head positioning means including position selector means comprising a control member and a plurality of circularly spaced stop members; said control member being relatively rotatable with respect to said plurality of stop members; and said stop members being individually and selectively actuatable with respect to said control member to effectively stop relative rotation therebetween in any of a plurality of predetermined positions; said pickup head positioning means also including mechanical coupling means effectively mechanically coupling the rotatable control member with respect to the pickup head and the recording medium whereby to effectively relatively position the pickup head, with respect to the recording medium, in any one of a plurality of selected positions extending across the recording medium and across said reproducing direction and along the path of reciprocating movement provided by said rotary-to-reciprocating movement translating crank means, said selected position being determined by the particular stop member selectively actuated by an operator of the apparatus.

2. Apparatus for reproducing any selected one of a plurality of recorded passages sequentially prerecorded on a continuous recording medium, comprising: a pickup head; motor means cooperable to relatively move in a reproducing direction, with respect to said pickup head and in reproduction relationship relative thereto, a continuous recording medium bearing a plurality of sequentially prerecorded passages; pickup head positioning means effectively cooperable with respect to the pickup head and the recording medium for positioning said pickup head, with respect to said recording medium, in any of a plurality of different selectable positions for reproducing a selected prerecorded passages; said pickup head positioning means including position selector means comprising a control member and a plurality of circularly spaced stop members; said control member being relatively rotatable with respect to said plurality of stop members; and said stop members being individually and selectively actuatable with respect to said control member to effectively stop relative rotation therebetween in any of a plurality of predetermined positions; said pickup head positioning means also including mechanical coupling means comprising rotary-to-reciprocating movement translating crank means consisting of connecting rod means effectively coupled adjacent a first end with respect to said rotatable control member at a location spaced from the center of rotation thereof and effectively coupled adjacent a second end with respect to said pickup head, said second end of said connecting rod means being effectively constrained to provide reciprocating movement of said pickup head along a line substantially across said reproducing direction whereby to effectively position said pickup head, with respect to the recording medium, in any one of a plurality of selected positions extending across the recording medium and across said reproducing direction and along the path of reciprocating movement provided by said rotary-to-reciprocating movement translating crank means, said selected position being determined by the particular stop member selectively actuated by an operator of the apparatus.

3. Apparatus for reproducing any selected one of a plurality of recorded passages sequentially prerecorded on a continuous recording medium, comprising: a pickup head; motor means cooperable to relatively move in a reproducing direction, with respect to said pickup head and in reproduction relationship relative thereto, a continuous recording medium bearing a plurality of sequentially prerecorded passages; pickup head positioning means effectively cooperable with respect to the pickup head and the recording medium for positioning said pickup head, with respect to said recording medium, in any of a plurality of different selectable positions for reproducing a selected prerecorded passage; said pickup head positioning means including position selector means comprising a control member and a plurality of circularly spaced stop members; said control member being relatively rotatable with respect to said plurality of stop members; and said stop members being individually and selectively actuatable with respect to said control member to effectively stop relative rotation therebetween in any of a plurality of predetermined positions; said pickup head positioning means also including mechanical coupling means comprising rotary-to-reciprocating movement translating crank means effectively mechanically coupling the rotatable control member with respect to the pickup head and the recording medium whereby to effectively relatively position the pickup head, with respect to the recording medium, in any one of a plurality of selected positions extending across the recording medium and across said reproducing direction and along the path of reciprocating movement provided by said rotary-to-reciprocating movement translating crank means, said selected position being determined by the particular stop member selectively actuated by an operator of the apparatus; and selectively operable motor means cooperable with respect to said control member and said plurality of stop members to cause relative rotation of said control member with respect to said plurality of stop members; said motor means being selectively operable in response to actuation of any particular stop member to cause relative rotation of said control member with respect to said stop members into a selected position determined by said particular stop member.

4. Apparatus for reproducing any selected one of a plurality of recorded passages sequentially prerecorded on a continuous recording medium, comprising: a pickup head; motor means cooperable to relatively move in a reproducing direction, with respect to said pickup head and in reproduction relationship relative thereto, a continuous recording medium bearing a plurality of sequentially prerecorded passages; pickup head positioning means effectively cooperable with respect to the pickup head and the recording medium for positioning said pickup head, with respect to said recording medium, in any of a plurality of different selectable positions for reproducing a selected prerecorded passage; said pickup head positioning means including position selector means comprising a control member and a plurality of circularly spaced stop members; said control member being relatively rotatable with respect to said plurality of stop members; and said stop members being individually and selectively actuatable with respect to said control member to effectively stop relative rotation therebetween in any of a plurality of predetermined positions; said pickup head positioning means also including mechanical coupling means comprising rotary-to-reciprocating movement translating crank means consisting of connecting rod means effectively coupled adjacent a first end with respect to said rotatable control member at a location spaced from the center of rotation thereof and effectively coupled adjacent a second end with respect to said pickup head, said second end of said connecting rod means being effectively constrained to provide reciprocating movement of said pickup head along a line substantially across said reproducing direction whereby to effectively position said pickup head, with respect to the recording medium, in any one of a plurality of selected positions extending across the recording medium and across said reproducing direction and along the path of reciprocating movement provided by said rotary-to-reciprocating movement translating crank means, said selected position being determined by the particular stop member selectively actuated by an operator of the apparatus; and selectively operable motor means cooperable with respect to said control member to rotate it with respect to said plurality of stop members; said motor means being selectively operable in response to actuation of any particular stop member to rotate said control member, with respect to said stop members, into a selected position determined by said particular stop member.

5. Apparatus for reproducing any selected one of a plurality of recorded passages sequentially prerecorded on a continuous recording medium, comprising: a pickup head; motor means cooperable to relatively move in a reproducing direction, with respect to said pickup head and in reproduction relationship relative thereto, a continuous recording medium bearing a plurality of sequentially prerecorded passages; pickup head positioning means effectively cooperable with respect to the pickup head and the recording medium for positioning said pickup head, with respect to said recording medium, in any of a plurality of different selectable positions for reproducing a selected prerecorded passage; said pickup head positioning means including position selector means comprising a control member and a plurality of circularly spaced stop members; said control member being relatively rotatable with respect to said plurality of stop members; and said stop members being individually and selectively actuatable with respect to said control member to effectively stop relative rotation therebetween in any of a plurality of predetermined positions; said pickup head positioning means also including mechanical coupling means comprising rotary-to-reciprocating movement translating crank means effectively mechanically coupling the rotatable control member with respect to the pickup head and the recording medium whereby to effectively relatively position the pickup head, with respect to the recording medium, in any one of a plurality of selected positions extending across the recording medium and across said reproducing direction and along the path of reciprocating movement provided by said rotary-to-reciprocating movement translating crank means, said selected position being determined by the particular stop member selectively actuated by an operator of the apparatus; and playback control means cooperable to effectively disengage the control member with respect to the pickup head when said pickup head has been effectively positioned with respect to the recording medium to play a prerecorded passage, and cooperable to effectively reengage the control member, with respect to the pickup head, after the passage of a predetermined period of playback time.

6. Apparatus for reproducing any selected one of a plurality of recorded passages sequentially prerecorded on a continuous recording medium, comprising: a pickup head; motor means cooperable to relatively move in a reproducing direction, with respect to said pickup head and in reproduction relationship relative thereto, a continuous recording medium bearing a plurality of sequentially prerecorded passages; pickup head positioning means effectively cooperable with respect to the pickup head and the recording medium for positioning said pickup head, with respect to said recording medium, in any of a plurality of different selectable positions for reproducing a selected prerecorded passage; said pickup head positioning means including position selector means comprising a control member and a plurality of circularly spaced stop members; said control member being relatively rotatable with respect to said plurality of stop members; and said stop members being individually and selectively actuatable with respect to said control member to effectively stop relative rotation therebetween in any of a plurality of predetermined positions; said pickup head positioning means also including mechanical coupling means comprising rotary-to-reciprocating movement translating crank means consisting of connecting rod means effectively coupled adjacent a first end with respect to said rotatable control member at a location spaced from the center of rotation thereof and effectively coupled adjacent a second end with respect to said pickup head, said second end of said connecting rod means being effectively constrained to provide reciprocating movement of said pickup head along a line substantially across said reproducing direction, whereby to effectively position said pickup head, with respect to the recording medium, in any one of a plurality of selected positions extending across the recording medium and across said reproducing direction and along the path of reciprocating movement provided by said rotary-to-reciprocating movement translating crank means, said selected position being determined by the particular stop member selectively actuated by an operator of the apparatus; and playback control means cooperable to effectively disengage said connecting rod means with respect to the pickup head when said pickup head has been effectively positioned with respect to the recording medium to play a prerecorded passage, and cooperable to effectively reengage said connecting rod means, with respect to the pickup head, after the passage of a predetermined period of playback time.

7. Apparatus for reproducing any selected one of a plurality of recorded passages sequentially prerecorded on a continuous recording medium, comprising: a pickup head; motor means cooperable to relatively move in a reproducing direction, with respect to said pickup head and in reproduction relationship relative thereto, a continuous recording medium bearing a plurality of sequentially prerecorded passages; pickup head positioning means effectively cooperable with respect to the pickup head and the recording medium for positioning said pickup head, with respect to said recording medium, in any of a plurality of different selectable positions for reproducing a selected prerecorded passage; said pickup head positioning means including position selector means comprising a control member and a plurality of circularly spaced stop members; said control member being relatively rotatable with respect to said plurality of stop members; and said stop members being individually and selectively actuatable with respect to said control member to effectively stop relative rotation therebetween in any of a plurality of predetermined positions; said pickup head positioning means also including mechanical coupling means comprising rotary-to-reciprocating movement translating crank means effectively mechanically coupling the rotatable control member with respect to the pickup head and the recording medium whereby to effectively relatively position the pickup head, with respect to the recording medium in any one of a plurality of selected positions extending across the recording medium and across said reproducing direction and along the path of reciprocating movement provided by said rotary-to-reciprocating movement translating crank means, said selected position being determined by the particular stop member selectively actuated by an operator of the apparatus, and selectively operable motor means cooperable with respect to said control member and said plurality of stop members to cause relative rotation of said control member with respect to said plurality of stop members; said motor means being selectively operable in response to actuation of any particular stop member to cause relative rotation of said control member with respect to said stop members into a selected position determined by said particular stop member; and playback control means cooperable to effectively disengage the control member with respect to the pickup head when said pickup head has been effectively positioned with respect to the recording medium to play a prerecorded passage, and cooperable to effectively reengage the control member, with respect to the pickup head, after the passage of a predetermined period of playback time.

8. Apparatus for reproducing any selected one of a plurality of recorded passages sequentially prerecorded on a continuous recording medium, comprising: a pickup head; motor means cooperable to relatively move in a reproducing direction, with respect to said pickup head and in reproduction relationship relative thereto, a continuous recording medium bearing a plurality of sequentially prerecorded passages; pickup head positioning means effectively cooperable with respect to the pickup head and the recording medium for positioning said pickup head, with respect to said recording medium, in any of a plurality of different selectable positions for reproducing a selected prerecorded passage; said pickup head positioning means including position selector means comprising a control member and a plurality of circularly spaced stop members; said control member being relatively rotatable with respect to said plurality of stop members; and said stop members being individually and selectively actuatable with respect to said control member to effectively stop relative rotation therebetween in any of a plurality of predetermined positions; said pickup head positioning means also including mechanical coupling means comprising rotary-to-reciprocating movement translating crank means consisting of connecting rod means effectively coupled adjacent a first end with respect to said rotatable control member at a location spaced from the center of rotation thereof and effectively coupled adjacent a second end with respect to said pickup head, said second end of said connecting rod means being effectively constrained to provide reciprocating movement of said pickup head along a line substantially across said reproducing direction whereby to effectively position said pickup head, with respect to the recording medium, in any one of a plurality of selected positions extending across the recording medium and across said reproducing direction and along the path of reciprocating movement provided by said rotary-to-reciprocating movement translating crank means, said selected position being determined by the particular stop member selectively actuated by an operator of the apparatus; and selectively operable motor means cooperable with respect to said control member to rotate it with respect to said plurality of stop members; said motor means being selectively operable in response to actuation of any particular stop member to rotate said control member, with respect to said stop members, into a selected position determined by said particular stop member; and playback control means cooperable to effectively disengage said connecting rod means with respect to the pickup head when said pickup head has been effectively positioned with respect to the recording medium to play a prerecorded passage, and cooperable to effectively reengage said connecting rod means,, with respect to the pickup head, after the passage of a predetermined period of playback time.

9. Apparatus for reproducing any selected one of a plurality of recorded passages sequentially prerecorded on a continuous recording medium, comprising: a pickup head; motor means cooperable to relatively move, with respect to said pickup head and in reproduction relationship relative thereto, a continuous recording medium bearing a plurality of sequentially prerecorded passages; pickup head positioning means effectively cooperable with respect to the pickup head and the recording medium for positioning said pickup head, with respect to said recording medium, in any of a plurality of different selectable positions for reproducing a selected prerecorded passage; said pickup head positioning means including position selector means comprising a control member and a plurality of circularly spaced stop members; said control member being relatively rotatable with respect to said plurality of stop members; and said stop members being individually and selectively actuatable with respect to said control member to effectively stop relative rotation therebetween in any of a plurality of predetermined positions; said pickup head positioning means also including mechanical coupling means comprising rotary-to-reciprocating movement translating means consisting of connecting rod means effectively pivotally connected adjacent a first end with respect to said rotatable control member at a location remote from the center thereof and effectively pivotally connected adjacent a second end with respect to said pickup head, means constraining said second end of said connecting rod means to provide reciprocating movement only along a line substantially perpendicular to the direction of movement of said pickup head relative to said recording medium during reproduction of said recorded passages whereby to effectively position said pickup head, with respect to the recording medium, in any one of a plurality of selected positions extending across the recording medium and across said reproducing direction and along the path of reciprocating movement provided by said rotary-to-reciprocating movement translating crank means, said selected position being determined by the particular stop member selectively actuated by an operator of the apparatus.

10. Apparatus for reproducing any selected one of a plurality of recorded passages sequentially prerecorded on a continuous recording medium, comprising: a pickup head; motor means cooperable to relatively move, with respect to said pickup head and in reproduction relationship relative thereto, a continuous recording medium bearing a plurality of sequentially prerecorded passages; pickup head positioning means effectively cooperable with respect to the pickup head and the recording medium for positioning said pickup head, with respect to said recording medium, in any of a plurality of different selectable positions for reproducing a selected prerecorded passage; said pickup head positioning means including position selector means comprising a control member and a plurality of circularly spaced stop members; said control member being relatively rotatable with respect to said plurality of stop members; and said stop members being individually and selectively actuatable with respect to said control member to effectively stop relative rotation therebetween in any of a plurality of predetermined positions; said pickup head positioning means also including mechanical coupling means comprising rotary-to-reciprocating movement translating means consisting of connecting rod means effectively pivotally connected adjacent a first end with respect to said rotatable control member at a location remote from the center thereof and effectively pivotally connected adjacent a second end with respect to said pickup head, means constraining said second end of said connecting rod means to provide reciprocating movement only along a line substantially perpendicular to the direction of movement of said pickup head relative to said recording medium during reproduction of said recorded passages whereby to effectively position said pickup head, with respect to the recording medium, in any one of a plurality of selected positions extending across the recording medium and across said reproducing direction and along the path of reciprocating movement provided by said rotary-to-reciprocating movement translating crank means, said selected position being determined by the particular stop member selectively actuated by an operator of the apparatus; and selectively operable motor means cooperable with respect to said control member to rotate it with respect to said plurality of stop members; said motor means being selectively operable in response to actuation of any particular stop member to rotate said control member, with respect to said stop members; into a selected position determined by said particular stop member.

11. Apparatus for reproducing any selected one of a plurality of recorded passages sequentially prerecorded on a continuous recording medium, comprising: a pickup head; motor means cooperable to relatively move, with respect to said pickup head and in reproduction relationship relative thereto, a continuous recording medium bearing a plurality of sequentially prerecorded passages; pickup head positioning means effectively cooperable with respect to the pickup head and the recording medium for positioning said pickup head, with respect to said recording medium, in any of a plurality of different selectable positions for reproducing a selected prerecorded passage; said pickup head positioning means including position selector means comprising a control member and a plurality of circularly spaced stop members; said control member being relatively rotatable with respect to said plurality of stop members; and said stop members being individually and selectively actuatable with respect to said control member to effectively stop relative rotation therebetween in any of a plurality of predetermined positions; said pickup head positioning means also including mechanical coupling means comprising rotary-to-reciprocating movement translating means consisting of connecting rod means effectively pivotally connected adjacent a first end with respect to said rotatable control member at a location remote from the center thereof and effectively pivotally connected adjacent a second end with respect to said pickup head, means constraining said second end of said connecting rod means to provide reciprocating movement only along a line substantially perpendicular to the direction of movement of said pickup head relative to said recording medium during reproduction of said recorded passages whereby to effectively position said pickup head, with respect to the recording medium, in any one of a plurality of selected positions extending across the recording medium and across said reproducing direction and along the path of reciprocating movement provided by said rotary-to-reciprocating movement translating crank means, said selected position being determined by the particular stop member selectively actuated by an operator of the apparatus; and playback control means cooperable to effectively disengage said connecting rod means with respect to the pickup head when said pickup head has been effectively positioned with respect to the recording medium to play a prerecorded passage, and cooperable to effectively reengage said connecting rod means, with respect to the pickup head, after the passage of a predetermined period of playback time.

12. Apparatus for reproducing any selected one of a plurality of recorded passages sequentially prerecorded on a continuous recording medium, comprising: a pickup head; motor means cooperable to relatively move, with respect to said pickup head and in reproduction relationship relative thereto, a continuous recording medium bearing a plurality of sequentially prerecorded passages; pickup head positioning means effectively cooperable with respect to the pickup head and the recording medium for positioning said pickup head, with respect to said recording medium, in any of a plurality of different selectable positions for reproducing a selected prerecorded passage; said pickup head positioning means including position selector means comprising a control member and a plurality of circularly spaced stop members; said control member being relatively rotatable with respect to said plurality of stop members; and said stop members being individually and selectively actuatable with respect to said control member to effectively stop relative rotation therebetween in any of a plurality of predetermined positions; said pickup head positioning means also including mechanical coupling means comprising rotary-to-reciprocating movement translating means consiting of connecting rod means effectively pivotally connected adjacent a first end with respect to said rotatable control member at a location remote from the center thereof and effectively pivotally connected adjacent a second end with respect to said pickup head, means constraining said second end of said connecting rod means to provide reciprocating movement only along a line substantially perpendicular to the direction of movement of said pickup head relative to said recording medium during reproduction of said recorded passages whereby to effectively position said pickup head, with respect to the recording medium, in any one of a plurality of selected positions extending across the recording medium and across said reproducing direction and along the path of reciprocating movement provided by said rotary-to-reciprocating movement translating crank means, said selected position being determined by the particular stop member selectively actuated by an operator of the apparatus; and selectively operable motor means cooperable with respect to said control member to rotate it with respect to said plurality of stop members; said motor means being selectively operable in response to actuation of any particular stop member to rotate said control member, with respect to said stop members, into a selected position determined by said particular stop member; and playback control means cooperable to effectively disengage said connecting rod means with respect to the pickup head when said pickup head has been effectively positioned with respect to the recording medium to play a prerecorded passage, and cooperable to effectively reengage said connecting rod means, with respect to the pickup head, after the passage of a predetermined period of playback time.

13. Apparatus for reproducing any preselectable passage of a plurality of recorded passages in closely adjacent laterally spaced tracks on a single record medium, comprising: a rotatable support for said medium; drive means for rotating said support to advance said tracks in the direction of their length past a playback head; a playback head; means supporting the playback head for indexing movement laterally across the medium to operative positions corresponding respectively to said passages; indexing means for moving said head supporting means to any of said positions; selector means controlling said drive means and said indexing means and operable for preselecting any of said passages for reproduction including a plurality of manually actuatable selectors corresponding respectively to said operative positions and means whereby each selector is operable to effect operation of said drive means for a predetermined period and operation of said indexing means for a preliminary portion of said predetermined period to position said head in the operative position corresponding to an actuated selector; and means for separating said playback head and said medium for indexing during said preliminary portion of the predetermined period and then re-engaging the head and medium at the beginning of the selected passage.

14. Apparatus for reproducing any preselectable passage of a plurality of recorded passages in closely adjacent laterally spaced tracks on a single record medium, comprising: a rotatable support for said medium; drive means for rotating said support to advance said tracks in the direction of their length past a playback head; a playback head; means supporting the playback head for indexing movement laterally across the medium to operative positions corresponding respectively to said passages; indexing means for moving said head supporting means to any of said positions; a stop engaging member movable with the indexing means and head supporting means; selector means controlling said drive means and said indexing means and operable for preselecting any of said passages for reproduction including a plurality of stop members corresponding respectively to said operative positions of the head, each stop member positionable to engage said stop engaging member to stop the latter with the head positioned for engagement with one track, a plurality of manually actuatable selectors corresponding respectively to said operative positions, and means rendering each selector operable to effect positioning of one stop member, operation of said drive means for a predetermined period and operation of said indexing means for a preliminary portion of said predetermined period to position said head in the operative position corresponding to the actuated selector; and means for elevating said playback head for indexing during said preliminary portion of said predetermined period and then lowering the head to operatively engage the selected track at the beginning of the selected passage.

15. Apparatus for reproducing a preselectable plurality of consecutive or non-consecutive recorded passages of a large number of passages in closely adjacent laterally spaced tracks on a single record medium, comprising: a rotatable support for supporting said medium; drive means for rotating said support to advance said tracks in the direction of their length past a playback head; a playback head; means supporting the playback head for indexing movement laterally across the width of said medium to operative positions corresponding respectively to said large number of passages; indexing means for moving said head supporting means to any of said positions; a stop engaging member movable with the indexing means and head supporting means; selector means controlling said drive means and said indexing means and operable for preselecting a plurality of consecutive or non-consecutive passages for reproduction including a plurality of stop members corresponding respectively to said operative positions of the head, each stop member positionable to engage said stop engaging member to stop the latter with the head positioned for engagement with one track, a plurality of manually actuatable selectors corresponding respectively to said stop members, and means whereby each selector is operable to effect positioning of one stop member, operation of said drive means for a predetermined period of rotation and operation of said indexing means to position said head in the operative position corresponding to an actuated selector; means for separating said head and medium during a predetermined preliminary portion of said period of rotation during indexing and then re-engaging said head and medium at a predetermined position corresponding to the beginning of the selected passage and means operating to render any plurality of preselected actuated selectors automatically operable to successively reproduce corresponding passages.

16. Apparatus for reproducing a preselectable plurality of consecutive or non-consecutive recorded passages of a large number of passages in closely adjacent laterally spaced tracks on a single record medium, comprising: means for supporting said medium; means for advancing said medium to move said tracks in the direction of their length past a playback head; a playback head: means supporting the playback head for indexing movement laterally across the width of said medium to operative positions corresponding respectively to said large number of passages; indexing means for moving said head supporting means to any of said positions; a stop engaging member movable with the indexing means and head supporting means; selector means controlling said indexing means and operable for preselecting a plurality of consecutive or non-consecutive passages for reproduction including a plurality of stop members corresponding respectively to said operative positions of the head, each stop member movable between an inoperative position and an operative position engageable with said stop engaging member to stop the latter with the head positioned for engagement with one track, a plurality of manually actuatable selectors corresponding respectively to said stop members, and means responsive to actuation of any selector for effecting operation of the corresponding stop member and operation of said indexing means to position said head in the operative position corresponding to an actuated selector; means responsive to actuation of any selector for effecting operation of said medium advancing means to advance the medium past the head after the head is indexed to a preselected operative position; and means operating to render any plurality of preselected actuated selectors automatically operable to successively reproduce corresponding passages.

17. Apparatus for reproducing any preselectable passage of a plurality of recorded passages in closely adjacent laterally spaced tracks on a single record medium, comprising: a rotatable support for said medium; drive means for rotating said support to advance said tracks in the direction of their length past a playback head; a playback head; means supporting the playback head for indexing movement laterally across the medium to operative positions corresponding respectively to said passages; indexing means for positioning said head supporting means to any of said positions including a drive motor, means for energizing the drive motor at a low voltage, and a slip coupling connecting the drive motor and head supporting means enabling continued energization of the drive motor when the playback head is held against movement; a stop engaging member movable with the indexing means and head supporting means; selector means controlling said drive means and said indexing means and operable for preselecting any of said passages for reproduction including a plurality of stop members corresponding respectively to said operative positions of the head, each stop member positionable to engage said stop engaging member to stop the latter with the head positioned for engagement with one track, a plurality of manually actuatable selectors corresponding respectively to said operative positions, and means responsive to actuation of any selector for effecting operation of the corresponding stop member, operation of said drive means for a predetermined period and temporary operation of said indexing means drive motor at a high voltage to rapidly position said head in the operative position corresponding to the actuated selector; and means for elevating said playback head during a predetermined preliminary portion of said predetermined period during indexing and then lowering the head to operatively engage the selected track at the beginning of the selected passage.

18. Apparatus for reproducing a preselectable plurality of consecutive or non-consecutive recorded passages of a large number of passages in closely adjacent laterally spaced tracks on a single record medium, comprising: a rotatable support for supporting said medium; drive means for rotating said support to advance said tracks in the direction of their length past a playback head; a playback head; means supporting the playback head for indexing movement laterally across the width of said medium to operative positions corresponding respectively to said large number of passages; indexing means for positioning said head supporting means in any of said positions including a drive motor, means for energizing the drive motor at a low voltage continuously, and a slip coupling connecting the drive motor and head supporting means enabling continued energization of the drive motor when the playback head is held against movement; a stop engaging member movable with the indexing means and head supporting means; selector means controlling said drive means and said indexing means and operable for preselecting a plurality of consecutive or non-consecutive passages for reproduction including a plurality of stop members corresponding respectively to said operative positions of the head, each stop member positionable to engage said stop engaging member to stop the latter with the head positioned for engagement with one track, a plurality of manually actuatable selectors corresponding respectively to said stop members, and means responsive to actuation of any selector for effecting operation of the corresponding stop member, operation of said drive means for a predetermined period of rotation and temporary operation of said indexing means drive motor at a high voltage to rapidly position said head in the operative position corresponding to an actuated selector; means for separating said head and medium during a predetermined preliminary portion of said period of rotation during said indexing and then re-engaging said head and medium at a predetermined position corresponding to the beginning of the selected passage; and means operating to render any plurality of preselected actuated selectors automatically operable to successively reproduce corresponding passages.

19. Apparatus for reproducing any preselectable passage of a plurality of recorded passages in closely adjacent laterally spaced tracks on a single record medium, comprising: means for supporting said medium; means for advancing said medium to move said tracks in the direction of their length past a playback head; a playback head; means supporting the playback head for indexing movement laterally across the width of said medium to operative positions corresponding respectively to said large number of passages; indexing means for moving said head supporting means to any of said positions; a control member movable proportionately with the indexing means and playback head supporting means during indexing and having a stop engaging part thereon; selector means controlling said indexing means and operable for preselecting any of said passages for reproduction including a plurality of stop members corresponding respectively to said operative positions of the head, each stop member movable to an operative position engageable with said stop engaging part to stop the control member with the head positioned for engagement with one track, a plurality of manually actuatable selectors corresponding respectively to said stop members, and means responsive to actuation of any selector for effecting operation of the corresponding stop member and operation of said indexing means to position said head in the operative position corresponding to an actuated selector; means responsive to actuation of any selection for effecting operation of said medium advancing means to advance the medium past the head after the head is indexed to a preselected operative position; a kicker movable with the control member during indexing and movable relative thereto while the control member is stopped to disable the adjacent actuated stop member, and means responsive to movement of the medium past the head for actuating said kicker to disable the stop member and enable movement of the control member after reproduction of a selected passage.

20. Apparatus for reproducing any preselectable passage of a plurality of recorded passages in closely adjacent laterally spaced tracks on a single record medium, comprising: means for supporting said medium; means for advancing said medium to move said tracks in the direction of their length past a playback head; a playback head; means supporting the playback head for indexing movement laterally across the width of said medium to operative positions corresponding respectively to said large number of passages; indexing means for moving said head supporting means to any of said positions; a control member movable proportionately with the indexing means and playback head supporting means during indexing and having a stop engageable part thereon; selector means controlling said indexing means and operable for preselecting any of said passages for reproduction including a plurality of stop members corresponding respectively to said operative positions of the head, each stop member movable to an operative position engageable with said stop engaging part to stop the control member with the head positioned for engagement with one track, a plurality of manually actuatable selectors corresponding respectively to said stop members, and means whereby each selector is operable to effect operation of the corresponding stop member and operation of said indexing means to position said head in the operative position corresponding to an actuated selector including a solenoid for positioning each stop member and a holding circuit for each solenoid including an openable switch; means responsive to actuation of any selector for effecting operation of said medium advancing means to advance the medium a predetermined distance past the head after the head is indexed to a preselected operative position to enable complete reproduction of a selected passage; a kicker movable with the control member during indexing and slidable relative thereto while the control member is stopped to open the switch of the adjacent actuated stop member to disable the stop member, and means responsive to movement of the medium past the head for actuating the kicker to disable the stop member and enable movement of the control member after reproduction of a selected passage.

References Cited in the file of this patent

UNITED STATES PATENTS

| | | |
|---|---|---|
| 2,235,301 | Robinson | Mar. 18, 1941 |
| 2,572,609 | Gierwiatowski | Oct. 23, 1951 |

FOREIGN PATENTS

| | | |
|---|---|---|
| 680,810 | Great Britain | Oct. 15, 1952 |